US008843147B2

(12) United States Patent
Talley et al.

(10) Patent No.: US 8,843,147 B2
(45) Date of Patent: *Sep. 23, 2014

(54) METHOD AND SYSTEM OF ASSIGNING A CHANNEL WITHOUT PAGING

(75) Inventors: Ryan Talley, Overland Park, KS (US); Andrew M. Wurtenberger, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 227 days.

This patent is subject to a terminal disclaimer.

(21) Appl. No.: 13/531,083

(22) Filed: Jun. 22, 2012

(65) Prior Publication Data

US 2012/0276914 A1 Nov. 1, 2012

Related U.S. Application Data

(63) Continuation of application No. 11/810,665, filed on Jun. 6, 2007, now Pat. No. 8,244,273.

(51) Int. Cl.
*H04W 72/00* (2009.01)
*H04W 4/02* (2009.01)
*H04W 72/04* (2009.01)

(52) U.S. Cl.
CPC ............ *H04W 72/00* (2013.01); *H04W 72/042* (2013.01); *H04W 4/021* (2013.01)
USPC ..... 455/450; 455/456.1; 455/515; 455/435.1; 370/329; 370/335

(58) Field of Classification Search
CPC .... H04W 72/00; H04W 4/021; H04W 72/042
USPC ......... 370/312, 329, 431, 432, 436, 437, 439, 370/443, 464, 465, 342, 331, 337, 314, 408, 370/372; 455/446.1, 450, 451, 452.1, 455, 455/456.1, 456.5, 458, 464, 507, 509, 511, 455/515, 516, 517, 521, 422.1, 277.2, 437, 455/522, 435.1, 456.2; 380/247; 713/169
See application file for complete search history.

(56) References Cited

U.S. PATENT DOCUMENTS 6,075,990 A * 6/2000 Shin ............................. 455/440
6,137,783 A * 10/2000 Sallberg ........................ 370/316
(Continued)

FOREIGN PATENT DOCUMENTS

EP 0 926 844 6/1999

OTHER PUBLICATIONS

Akyildiz, Ho, et al. Abstract of "Movement-Based Location Update and Selective Paging for PCSnetworks," IEEE/ACM Transactins, vol. 4, Issue 4, p. 629 (Aug. 1996).

(Continued)

*Primary Examiner* — Mahendra Patel

(57) ABSTRACT

A method and system for setting up a communication with a given mobile station served by a RAN that defines one or more coverage areas. The RAN may receive an indication of a location of the given mobile station. The RAN may then use the location of the given mobile station to identify one or more wireless coverage areas associated with the given mobile station. The RAN may also receive a request to set up a communication with the given mobile station. In response, the RAN may assign a channel for the communication to the given mobile station in each identified wireless coverage area without first paging the given mobile station.

17 Claims, 5 Drawing Sheets

(56) References Cited

U.S. PATENT DOCUMENTS

| | | |
|---|---|---|
| 6,185,421 B1 | 2/2001 | Alperovich et al. |
| 6,377,560 B1 * | 4/2002 | Dailey .................... 370/329 |
| 7,076,256 B1 * | 7/2006 | Orler et al. ................ 455/456.1 |
| 7,180,879 B2 * | 2/2007 | Sinnarajah et al. ........... 370/335 |
| 7,333,797 B2 * | 2/2008 | Thorson .................... 455/410 |
| 7,787,421 B2 | 8/2010 | Ramanna et al. |
| 8,244,273 B1 * | 8/2012 | Talley et al. ................ 455/450 |
| 2003/0035393 A1 | 2/2003 | Sinnarajah et al. |
| 2003/0119535 A1 | 6/2003 | Needham et al. |
| 2004/0110511 A1 | 6/2004 | Schmidt et al. |
| 2006/0068813 A1 | 3/2006 | Ku et al. |
| 2006/0217118 A1 | 9/2006 | Benco et al. |
| 2006/0276197 A1 * | 12/2006 | Heo ........................ 455/450 |
| 2008/0062891 A1 * | 3/2008 | Van der Merwe et al. .... 370/254 |
| 2008/0076436 A1 | 3/2008 | Sanders et al. |
| 2008/0146252 A1 | 6/2008 | Razdan |
| 2009/0323604 A1 * | 12/2009 | De Jaeger et al. ........... 370/329 |

OTHER PUBLICATIONS

Hsiao-Kuang Wu et al. "Personal Paging Area Design Based on Mobile's Moving Behaviors," INFOCOM vol. 1 pp. 21-30 (2001).

* cited by examiner

METHOD AND SYSTEM OF ASSIGNING A CHANNEL WITHOUT PAGING

REFERENCE TO RELATED APPLICATION

This is a continuation of U.S. patent application Ser. No. 11/810,665, filed on Jun. 6, 2007, the entirety of which is hereby incorporated by reference.

FIELD OF THE INVENTION

The present invention relates to wireless communications and, more particularly, to setting up a wireless communication with a mobile station served by a radio access network.

BACKGROUND

The art and popularity of wireless communications has grown significantly over recent years. Indeed, millions of people are engaging in voice and data communications using mobile stations such as cellular telephones and Personal Digital Assistants (PDAs). In principle, a user can communicate over the Internet or call anyone over the Public Switched Telephone Network (PSTN) from any place inside the coverage area of a cellular wireless network.

In a typical cellular wireless network, an area is divided geographically into a number of cells and cell sectors, each defined by a radio frequency (RF) radiation pattern from a respective antenna structure in the cellular wireless network. Within each cell sector, the RF radiation pattern provides an air interface over which mobile stations may communicate with the cellular wireless network. In turn, the cellular wireless network may communicate with one or more other networks, such as the PSTN or a packet-switched network (e.g., the Internet). As such, when a mobile station is positioned within the coverage area of the cellular wireless network (e.g., in given cell sector), the mobile station can communicate with entities on the other networks via the cellular wireless network.

The RF air interface of any given cell sector in the cellular wireless network is typically divided into a plurality of channels for carrying communications between the mobile stations and the cellular wireless network. For example, the RF air interface may include a plurality of forward-link channels, such as pilot channels, sync channels, paging channels, and forward-traffic channels, for carrying communications from the cellular wireless network to the mobile stations. As another example, the RF air interface may include a plurality of reverse-link channels, such as access channels and reverse-traffic channels, for carrying communications from the mobile stations to the cellular wireless network. However, the number of channels on the air interface, and thus the number of simultaneous communications the air interface can support, is limited by hardware and/or protocol constraints. As such, cellular wireless networks often try to conserve the limited supply of channels by assigning them on an as-needed basis.

One common way a cellular wireless network conserves channels is by employing a paging process to locate a given mobile station before assigning a channel to the given mobile station. More particularly, when the cellular wireless network receives a request to set up a communication with a given mobile station, the cellular wireless network may send a page message over a paging channel in each of a plurality of cell sectors for receipt by the given mobile station. In this respect, the cellular wireless network is able to locate the given mobile station using the paging channel in each cell sector, without tying up traffic channels.

Thereafter, if the given mobile station receives the page message in a given cell sector, the given mobile station may indicate its location in the given cell sector by sending a response back to the cellular wireless network over an access channel of the given cell sector. In turn, the cellular wireless network may then assign the given mobile station a traffic channel in the given cell sector by (i) reserving an available traffic channel for communication with the given mobile station, and (ii) sending the given mobile station a channel assignment message identifying the reserved traffic channel. Upon receipt of the channel assignment message, the given mobile station may then acquire the identified traffic channel, and communication over the traffic channel may begin shortly thereafter.

Although the paging process described above enables the cellular wireless network to conserve its limited supply of channels while locating mobile stations, the exchange of multiple paging messages, including delay between theses messages, may introduce latency into the communication setup process. This latency may be undesirable, especially for time sensitive applications such as Voice over IP (VoIP) and Push-to-Talk (PTT). As such, a cellular wireless network that reduces the latency in the communication setup process would be desirable.

SUMMARY

The present invention is directed to an innovative method and system for setting up a communication with a given mobile station served by a radio access network (RAN) that defines one or more coverage areas.

According to an example of the present invention, the given mobile station may send, and the RAN may receive, an indication of location of the given mobile station (e.g., a GPS location reading). In this respect, the given mobile station may send the indication at various times. For example, the given mobile station may send the indication after powering up. As another example, the given mobile station may send the indication periodically according to a schedule. As yet another example, the given mobile station may send the indication in response to a change in location. Other examples are possible as well.

After receiving the indication of location, the RAN may use the location of the given mobile station to identify one or more wireless coverage areas associated with the given mobile station. In this respect, the RAN may maintain information for its wireless coverage areas, and the RAN may then compare the location of the given mobile station to the information for its wireless coverage areas. Preferably, the RAN will identify at least one wireless coverage area that encompasses the location of the given mobile station. The RAN may also store the location of the given mobile station for future reference.

The RAN may then receive a request to set up a communication with the given mobile station. In turn, the RAN may assign a channel for the communication to the given mobile station in each identified wireless coverage area, without first paging the given mobile station. More particularly, for each identified wireless coverage area, the RAN may (i) reserve a channel for the communication and (ii) transmit a channel assignment message (e.g., a 1×RTT CAM or an EV-DO TCA) specifying the reserved channel for use by the given mobile station, without first sending a page message for receipt by the given mobile station. The channel assignment message may contain identifying information for the channel as well as an identifier of the intended recipient, which is the given mobile station.

If the given mobile station accepts assignment of a channel in a given wireless coverage area, the given mobile station may send to the RAN, and the RAN may receive, an indication that the given mobile station has accepted the assignment of the channel in the given wireless coverage area. In turn, the RAN may release assigned channels in other identified wireless coverage area. Further, if the given mobile station does not accept an assigned channel in an identified wireless coverage area within a predetermined time period, the RAN may also release the assigned channel. Still further, if the RAN determines that the given mobile station has not accepted the assignment of a channel in any of the one or more identified wireless coverage areas within a predetermined time period, the RAN may then page the given mobile station.

In summary, in accordance with one aspect, an exemplary embodiment of the present invention may take the form of a method for setting up a communication with a given mobile station served by a RAN that defines one or more coverage areas. The method may involve (a) receiving an indication of a location of the given mobile station, (b) using the location of the given mobile station to identify one or more wireless coverage areas associated with the given mobile station, (c) receiving a request to set up a communication with the given mobile station, and (d) assigning a channel for the communication to the given mobile station in each identified wireless coverage area without first paging the given mobile station.

Additionally, the method may also involve (e) receiving from the given mobile station an indication that the given mobile station has accepted assignment of a channel in a given identified wireless coverage area, (f) releasing an assigned channel in a first identified wireless coverage area in response to receiving an indication that the given mobile station has accepted assignment of a channel in a second identified wireless coverage area, (g) releasing an assigned channel in a given identified wireless coverage area after a predetermined time period unless the given mobile station has accepted assignment of the channel in the given identified wireless coverage area, and (h) determining that the given mobile station has not accepted the assignment of a channel in any of the one or more identified wireless coverage areas within a predetermined time period and responsively paging the given mobile station.

The indication of the location may be a GPS location reading from the given mobile station, which the given mobile station sends at various times. Further, the function of using the location of the given mobile station to identify one or more wireless coverage areas associated with the given mobile station may include (i) maintaining information about the one or more coverage areas of the radio access network, and (ii) comparing the location of the given mobile station to the information about the one or more coverage areas. Further yet, the identified one or more coverage areas will preferably encompass the location of the given mobile station.

The function of assigning a channel for the communication to the given mobile station in each identified wireless coverage area without first paging the given mobile station may include, for each identified wireless coverage area, (i) reserving a channel for the communication, and (ii) transmitting a channel assignment message specifying the reserved channel for use by the given mobile station, without first sending a page message for receipt by the given mobile station. The channel assignment message may be a 1×RTT CAM or an EV-DO TCA message for instance. Further, the channel assignment message may contain an identifier of the given mobile station as well as identifying information for the assigned channel (e.g., carrier frequency, PN offset, Walsh code, and/or MAC identifier).

In another aspect, an exemplary embodiment of the invention may take the form of a RAN serving a given mobile station. The RAN may include (a) an antenna structure for communicating with mobile stations via an air interface, (b) a communication interface for communicating with one or more networks, (c) a processor, (d) data storage, and (e) program instructions stored in the data storage and executable by the processor to carry out various functions as described herein.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
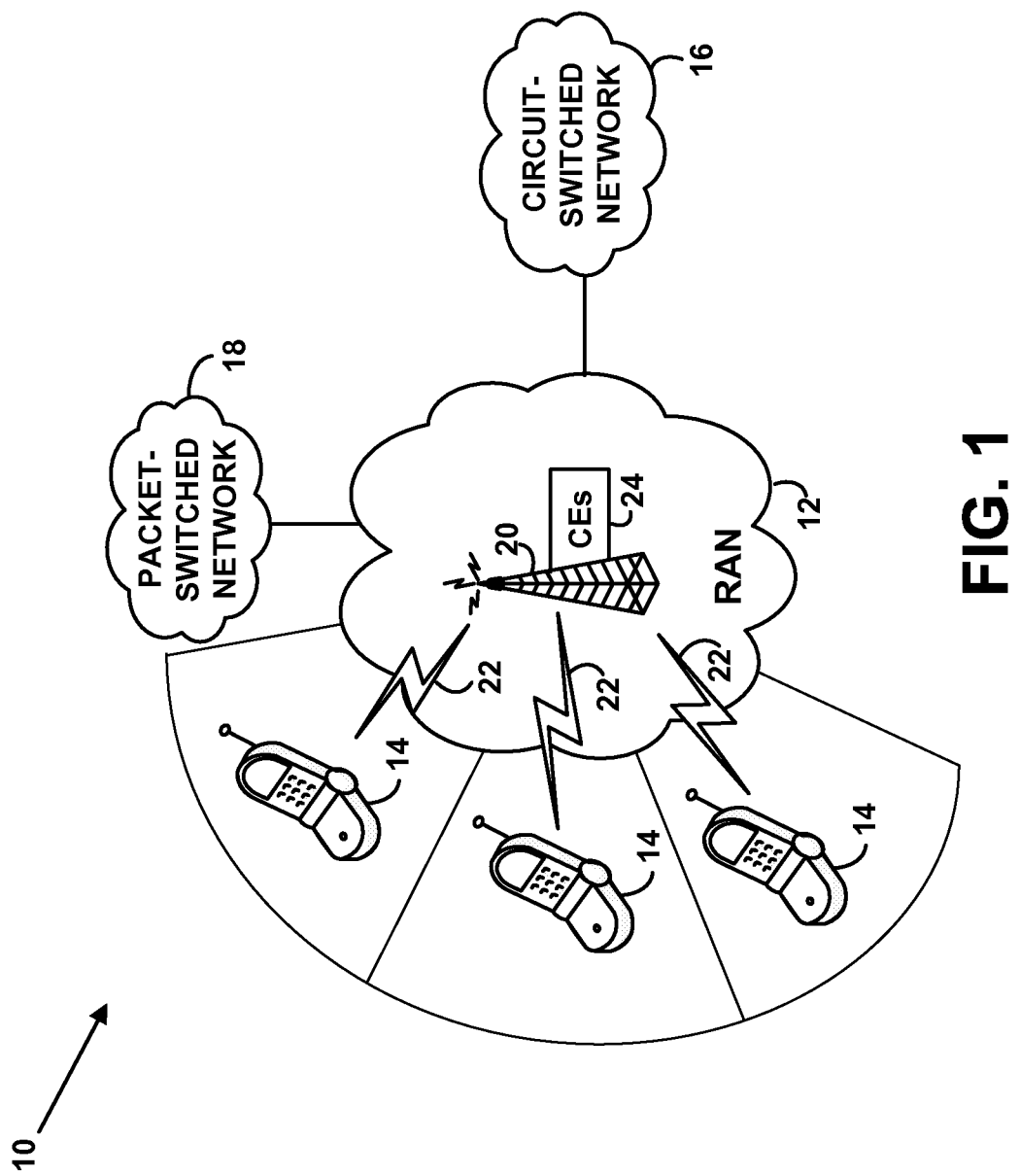
FIG. 1 is a simplified block diagram of a telecommunications system in which an exemplary embodiment of the invention can be implemented.

Referring to the drawings, FIG. 1 is a simplified block diagram of a telecommunications system 10 in which an exemplary embodiment of the invention can be implemented. As shown, the system 10 includes at its core a radio access network (RAN) 12, which may function to provide connectivity between one or more mobile stations 14 (e.g., a cell phone, PDA, or other wirelessly-equipped device), and one or more transport networks, such as a circuit-switched network 16 (e.g., the public switched telephone network (PSTN)) or a packet-switched network (e.g., the Internet) 18.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown in FIG. 1, the RAN 12 may include an antenna structure 20. (Although FIG. 1 depicts the RAN 12 with one antenna structure 20, it should be understood that the RAN 12 may include a plurality of antenna structures 20). The antenna structure 20 may transmit RF radiation patterns at one or more carrier frequencies, and the RF radiation patterns may then provide one or more air interfaces 22 through which the mobile stations 14 may communicate with the RAN 12. For example, the antenna structure 20 may transmit omni-directional RF radiation patterns that provide a single air interface 22. Alternatively, the antenna structure 20 may transmit directional RF radiation patterns that provide multiple air interfaces 22.

Each of one or more air interfaces 22 of the antenna structure 20 may then define a corresponding wireless coverage area of the antenna structure 20. For example, if the antenna structure 20 provides a single air interface 22, then the antenna structure 20 may serve a single wireless coverage area (e.g., a cell). In this respect, the air interface 22 and corresponding wireless coverage area may be characterized by the one or more carrier frequencies of the antenna structure 20. Alternatively, if the antenna structure 20 provides multiple air interfaces 22, the antenna structure 20 may serve multiple wireless coverage areas (e.g., cell sectors). In this respect, each of the air interfaces 22 and corresponding wireless coverage areas may be characterized by the one or more carrier frequencies of the antenna structure 20 and a pseudo-random number offset (PN offset) that distinguishes one wireless coverage area of the antenna structure 20 from another.

The air interfaces 22 may carry communications between the RAN 12 and mobile stations 14 according to any of a variety of protocols. For example, the air interfaces 22 may carry communications compliant with a Code Division Multiple Access (CDMA) protocol, such as IS-95, 1xRTT ("Single Carrier Radio Transmission Technology"), or EV-DO (Evolution Data Optimized). As another example, the air interfaces 22 may carry communications compliant with a Time Division Multiple Access (TDMA) or Global System for Mobile Communication (GSM) protocol. Other examples are possible as well.

Depending on the protocol employed, the air interfaces 22 may also be divided into a plurality of channels for carrying different types of communications between the mobile stations 14 and the RAN 12. For example, each air interface 22 may include a plurality of forward-link channels (e.g., control channels, forward-traffic channels, etc.) for carrying forward-link communications from the RAN 12 to the mobile stations 14. As another example, each air interface 22 may include a plurality of reverse-link channels (e.g., access channels, reverse-traffic channels, etc.) for carrying reverse-link communications from the mobile stations 14 to the RAN 12.

As show in FIG. 1, the RAN 12 may also include channel elements 24, which may function to support communication over the air interface channels by performing various signal processing functions. For example, without limitation, the channel elements 24 may perform forward-link encoding and modulation, data symbols addition, forward power gain adjustment, reverse-link demodulation, frame quality determination, and/or reverse power control. The RAN 12 may have one or more sets of channel elements 24, each corresponding to a different air interface 22 and wireless coverage area of the RAN 12. Preferably, each channel element 24 in a given set will then support a single air interface channel. As such, when a given mobile station 14 and the RAN 12 are engaged in communication over an air interface channel, the RAN 12 may dedicate a corresponding channel element 24 for that communication. The channel elements 24 may also provide an interface between the antenna structures 20 of the RAN 12 and other components of the RAN 12.

The RAN 12 may then provide connectivity to the circuit-switched network 16, such as the PSTN, and the packet-switched network 18, such as the Internet. Accordingly, with this general arrangement, the RAN 12 may facilitate communications between two mobile stations 14 within the RAN's coverage areas, as well as between a given mobile station 14 and another communication device coupled to the circuit-switched network 16 or the packet-switched network 18.

Figure 2:
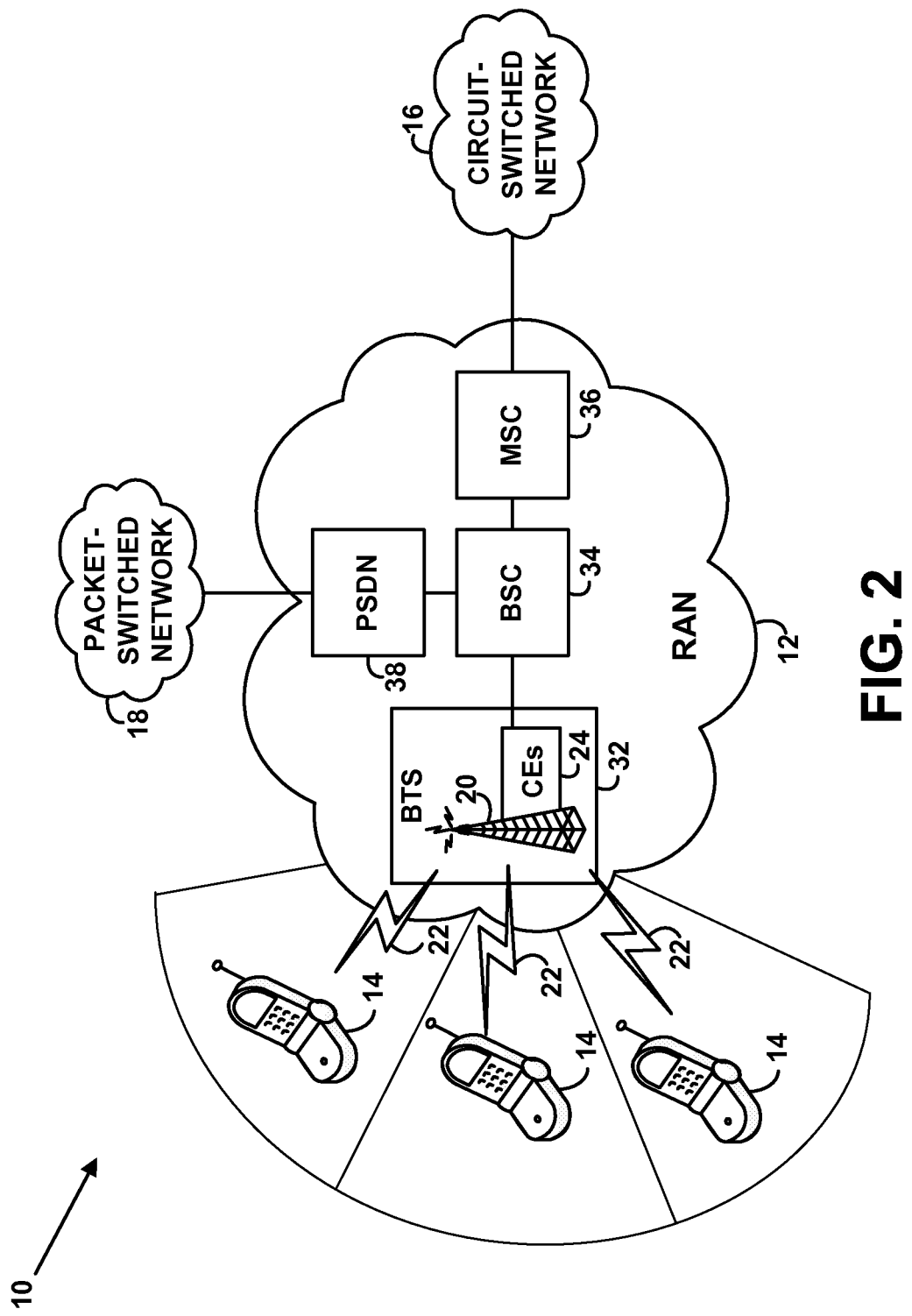
FIG. 2 is a simplified block diagram of the telecommunications system of FIG. 1 with a first exemplary radio access network for facilitating air interface communications according to a CDMA 1×RTT protocol.

Depending on the protocol used to carry communications between the RAN 12 and the mobile stations 14, the RAN 12 may include various entities for facilitating air interface communications with the mobile stations 14. FIG. 2 is a simplified block diagram of the system 10 with a first exemplary RAN 12 for facilitating air interface communications according to the CDMA 1xRTT protocol. As shown, the first exemplary RAN 12 may include at least one base transceiver stations (BTS) 32, a base station controller (BSC) 34, a mobile switching center (MSC) 36, and a packet data serving node (PDSN) 38.

Each BTS 32 of the first exemplary RAN 12 may include, among other components, at least one of the antenna structures 20 and one or more sets of channel elements 24. As such, each BTS 32 may provide one or more air interfaces 22 for communication with the mobile stations 14. Each BTS 32, via the channel elements 24, may then couple to the BSC 34, which may function to communicate with each BTS 32 and control aspects of the BTS 32 as well as aspects of the air interface communication with the mobile stations 14. The BTS 32 and the BSC 34 together may also be referred to as a "Base Station." The BSC 34 may then couple to the MSC 36, which may provide connectivity with the circuit-switched network 16 and/or a signaling network (not shown). Further, the BSC 34 may couple to the PDSN 38, which may provide connectivity with the packet-switched network 18. The connections between the entities of the exemplary RAN 12, other than the air interfaces 22, may include physical cables, such as T1 trunk lines or E1 trunk lines, and/or wireless links, such as microwave links or satellite channels.

According to the 1xRTT protocol, each air interface 22 and corresponding wireless coverage area of the first exemplary RAN 12 may be characterized by the one or more carrier frequencies of the antenna structure 20 and a PN offset that distinguishes one wireless coverage area from another. Further, according to the 1xRTT protocol, each air interface 22 may be divided into a plurality of channels that are distinguished by Walsh codes, which are digital modulation codes that distinguish individual signals on the one or more carrier frequencies being transmitted. These Walsh codes may be reused in adjacent wireless coverage areas because channel separation is provided by a different PN offset. As such, the given mobile station 14 and the RAN 12 may engage in 1xRTT communications over air interface channels characterized by one or more carrier frequencies, a PN offset, and a Walsh code.

Typically, when setting up a communication with a given mobile station 14 according to the 1xRTT protocol, the BSC 34 may first receive a Paging Request (e.g., from the MSC 36). In turn, the BSC 34 may direct the BTS 32 to send a Page Message over each air interface 22 for receipt by the given mobile station 14, in order to locate the given mobile station 14. If the given mobile station 14 is located in one of the wireless coverage areas of the first exemplary RAN 12 and receives the Page Message over a given air interface 22, the given mobile station 14 may then send a Page Response Message back to the first exemplary RAN 12 over the given air interface 22. Thereafter, the BSC 34 may direct the BTS 32 to send an Acknowledgement (ACK) message to the given mobile station 14, and the BSC may then direct the BTS 32 to send a Channel Assignment Message (CAM) to the given mobile station 14 that contains identifying information for a traffic channel. In this respect, the BSC 34 may also exchange signaling messages with the MSC 36 before directing the BTS 32 to send the CAM.

Figure 3:
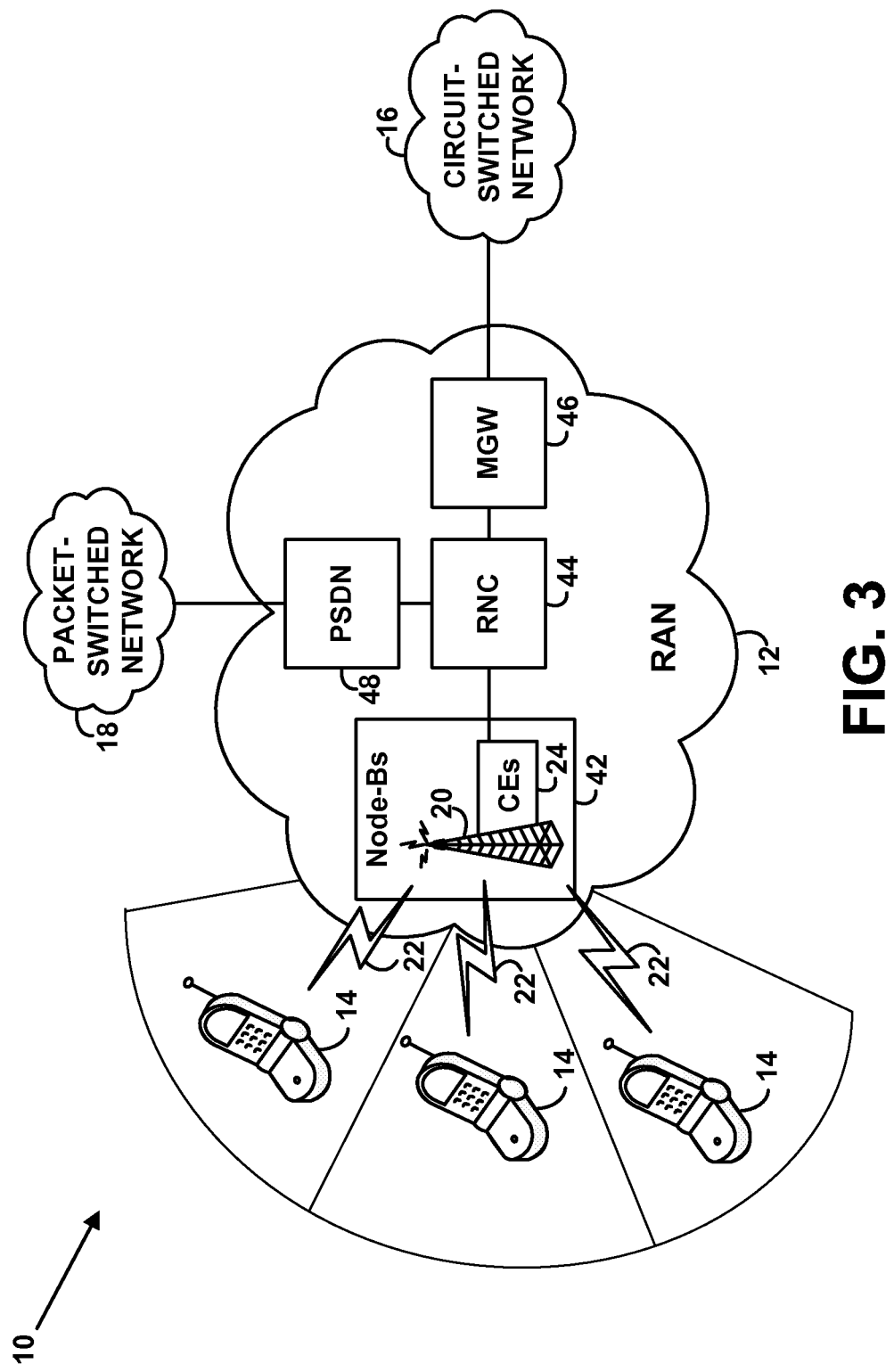
FIG. 3 is a simplified block diagram of the telecommunications system of FIG. 1 with a second exemplary radio access network for facilitating air interface communications according to a CDMA EV-DO protocol.

FIG. 3 is a simplified block diagram of the system 10 with a second exemplary RAN 12 for facilitating air interface communications according to the CDMA EV-DO protocol. As shown, the second exemplary RAN 12 of FIG. 3 may include at least one Node-Bs 42, a radio network controller (RNC) 44, a media gateway (MGW) 46, and a PSDN 48.

Each Node-Bs 42 of the second exemplary RAN 12 may include, among other components, at least one of the antenna structures 20 and one or more sets of channel elements 24. As such, each Node-Bs 42 may provide one or more air interfaces 22 for communication with the mobile stations 14. Each Node-Bs 42 may then couple to the RNC 44, which may function to communicate with each Node-Bs 42 and control aspects of the Node-Bs 42 as well as aspects of the air interface communication with the mobile stations 14. The Node-Bs 42 and the RNC 44 together may be referred to as an "Access Node." The RNC 44 may then couple to the MGW 46, which may provide connectivity with the circuit-switched network 16. Further, the RNC 44 may couple to the PDSN 38, which may provide connectivity with the packet-switched network 18. In this respect, the RNC 44 may additionally include a packet control function ("PCF") for controlling packet-data communications. The connections between the entities of the exemplary RAN 12, other than the air interfaces 22, may include physical cables, such as T1 trunk lines or E1 trunk lines, and/or wireless links, such as microwave links or satellite channels.

According to the EV-DO protocol, each air interface 22 and corresponding wireless coverage area of the second exemplary RAN 12 may be characterized by the one or more carrier frequencies of the antenna structure 20 and a PN offset that distinguishes one wireless coverage area from another. Further, according to the EV-DO protocol, the forward-link of each air interface 22 may be divided into time slots that are time division multiplexed to carry various channels, including a pilot channel (which carries an indication of PN offset), a Medium Access Control (MAC) channel, and a data channel that may include a forward traffic channel and a "control" channel. The data channels on the forward link are distinguished by MAC identifiers, which identify the time slots of the forward link which correspond to a given data channel. Further yet, according to the EV-DO protocol, the reverse-link of each air interface 22 may be divided into a plurality of channels that are distinguished by Walsh codes. As such, the given mobile station 14 and the RAN 12 may engage in EV-DO communications over air interface channels characterized by one or more carrier frequencies, a PN offset, and either a MAC identifier or a Walsh code.

Typically, when setting up a communication with a given mobile station 14 according to the EV-DO protocol, the RNC 44 may first direct the Node-Bs 42 to page the given mobile station 14. In turn, the Node-Bs 42 may acknowledge the RNC's paging request, and the Node-Bs may then send a Page Message (e.g., CCSynSS:Page message) over each air interface 22 for receipt by the given mobile station 14, in order to locate the given mobile station 14. If the given mobile station 14 is located in one of the wireless coverage areas of the second exemplary RAN 12 and receives the Page Message over a given air interface 22, the given mobile station 14 may then send a Connection Request message (e.g., AC:ConnectionRequest message) back to the second exemplary RAN 12 over the given air interface 22. Thereafter, the RNC 44 may perform various actions to facilitate communication with the given mobile station 14, such as determining whether the given mobile station is authorized to engage in packet-data communications and setting up a communication path with the PSDN 48. Once these actions are complete, the RNC 44 may then direct the Node-Bs 42 to send a Traffic Channel Assignment (TCA) message to the given mobile station 14 that contains identifying information for a traffic channel.

Figure 4:
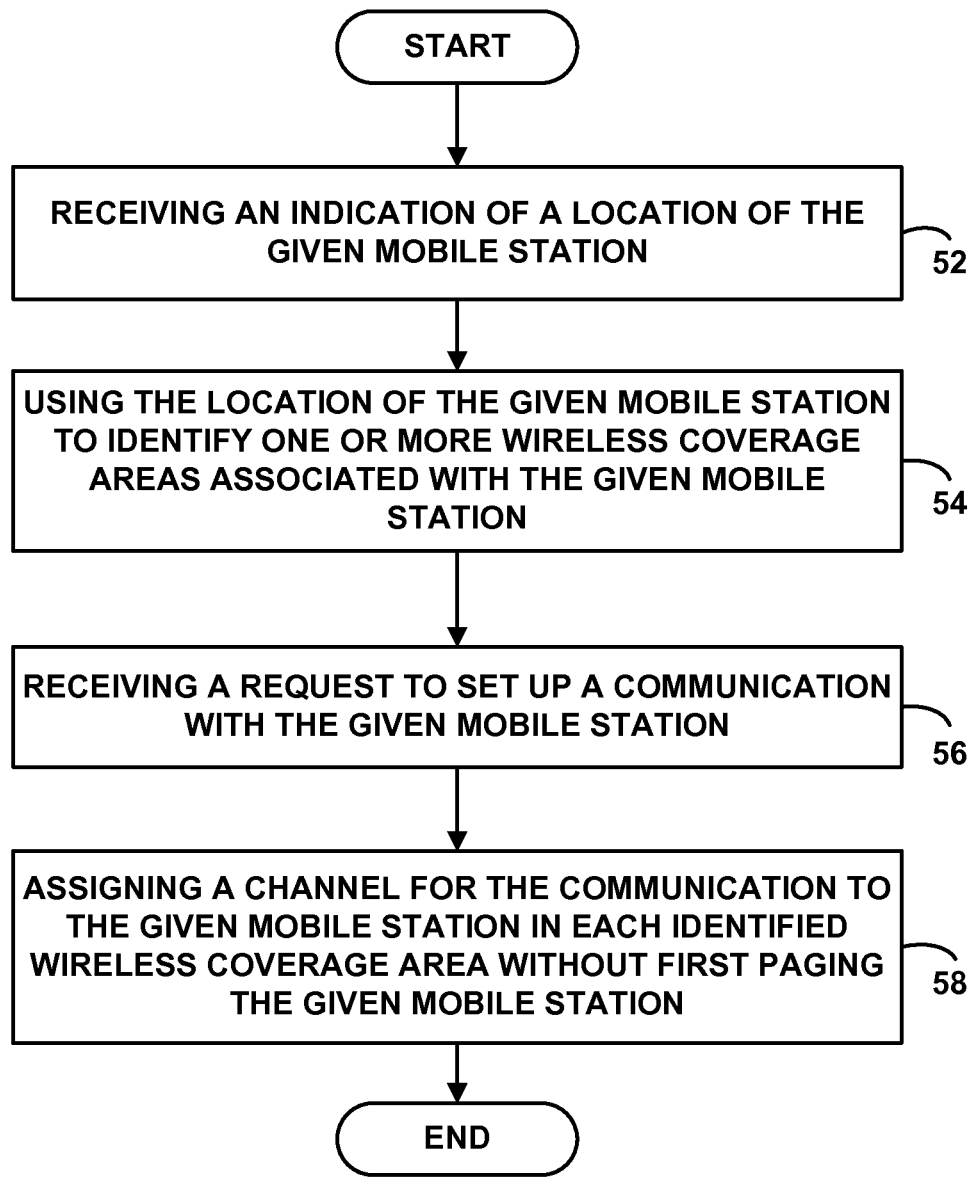
FIG. 4 is a flow chart depicting a method for setting up a communication with a given mobile station served by the radio access network of FIG. 1, according to the exemplary embodiment of the present invention.

FIG. 4 is a flow chart depicting a method for setting up a communication with a given mobile station 14 served by the RAN 12 that defines one or more coverage areas, according to the exemplary embodiment of the present invention. The RAN 12 may be either of the exemplary RANs described above, or some other RAN.

The method may begin at step 52 when the RAN 12 receives an indication of a location of the given mobile station 14. Preferably, the RAN 12 will receive the indication of location from the given mobile station 14 via an air interface 22. The given mobile station 14 may send indications of its location to the RAN 12, and the RAN 12 may then receive the indications of location, at various times.

For example, the given mobile station 14 may send indications of its location to the RAN 12 after powering up. As another example, the given mobile station 14 may send indications of its location to the RAN 12 periodically according to a schedule, such as every 30 minutes. As yet another example, the given mobile station 14 may send indications of its location to the RAN 12 in response to a change in location. In this respect, the given mobile station 14 may send an indication of its location when the given mobile station 14 has moved more than a predetermined distance since sending the last indication of location. Additionally or alternatively, the given mobile station 14 may send an indication of its location when the given mobile station 14 has moved into a different wireless coverage area. As a further example, the given mobile station 14 may send indications of its location to the RAN 12 in response to a request from the RAN 12. Ideally, in determining when to send the indications of location, the given mobile station 14 will balance the benefits of keeping the RAN 12 updated of its location with the drawbacks of overloading the network with location update messages. As such, the given mobile station 14 may additionally limit the number of location indications it sends to the RAN 12 in any given time period (e.g., only 1 message every 30 minutes).

The indication of location of the given mobile station may take a variety of forms. In one example, the indication of the location may consist of a GPS location reading, which the given mobile station 14 may determine via a GPS receiver. Alternatively, the indication of the location may consist of information about signals the given mobile station 14 is receiving from the RAN 12, such as detected strength of pilot signals of the one or more air interfaces 22, which the RAN 12 may use to determine the given mobile station's location. Other examples are possible as well. In any case, the given mobile station 14 may send the indication of location to the RAN 12 using different communication forms, including packet-data communication.

At step 54, the RAN 12 may then use the location of the given mobile station 14 to identify one or more wireless coverage areas associated with the given mobile station 14.

The RAN 12 may perform this function in response to (i) receiving the indication of the location of the given mobile station, (ii) receiving a request to set up a communication with the given mobile station 14 (as described at step 56), and/or (iii) some other triggering event.

To assist in identifying the wireless coverage areas associated with the given mobile station 14, the RAN 12 may maintain information for the wireless coverage areas that it serves. As an example, for each of its wireless coverage areas, the RAN 12 may maintain one or more identifiers of the wireless coverage area (e.g., a carrier frequency and/or PN offset) along with boundary information (e.g., coordinates) for the wireless coverage area. The RAN 12 may then compare the location of the given mobile station 14 to the maintained information for its wireless coverage areas, to identify which wireless coverage areas may be associated with the given mobile station 14. Preferably, the RAN 12 will identify at least one wireless coverage area that encompasses the location of the given mobile station 14, which may be referred to as a "reference sector." Further, the RAN 12 may identify other wireless coverage areas that do not encompass the location of the given mobile station 14, but are near the reference sector. For example, the RAN 12 may identify wireless coverage areas that are adjacent to the reference sector. Ideally, the identified wireless coverage areas associated with the given mobile station 14 will consist of the wireless coverage areas in which the given mobile station 14 may be located.

After receiving the indication of the location of the given mobile station 14, the RAN 12 may also store the location of the given mobile station 14. In this respect, the RAN 12 may maintain historical location data for various mobile stations 14, including the given mobile station 14. The RAN 12 may then use this historical location data to more accurately identify the wireless coverage areas associated with the given mobile station 14. For example, the RAN 12 may use the historical data to track past movement of the given mobile station 14 and predict future locations of the given mobile station 14 based on past movement, which may then enable the RAN 12 to identify wireless coverage areas that encompass and/or are near the predicted future locations.

At step 56, the RAN 12 may receive a request to set up a communication with the given mobile station 14. The requested communication may be any type of communication, including a phone call, a packet data-session, and/or a short message service (SMS) session. Further, the RAN 12 may receive the request from one of various system entities. For example, the RAN 12 may receive the request via the circuit-switched network 16 from a landline telephone or some other device coupled to the circuit-switched network 16. As another example, the RAN 12 may receive the request via the packet-switched network 18 from a VoIP telephone or some other device coupled to the packet-switched network 18. Many other examples are possible as well.

At step 58, after receiving the communication request, the RAN 12 may assign a channel for the communication to the given mobile station 14 in each identified wireless coverage area, without first paging the given mobile station 14. More particularly, for each identified wireless coverage area, the RAN 12 may (i) reserve a channel for the communication and (ii) transmit a channel assignment message specifying the reserved channel for use by the given mobile station, without first sending a page message for receipt by the given mobile station.

The RAN 12 may reserve the channel for the communication by reserving resources corresponding to the channel. For example, to reserve a 1×RTT channel in a given wireless coverage area, the RAN 12 may reserve a Walsh code and a channel element 24. As another example, to reserve an EV-DO channel in a given wireless coverage area, the RAN 12 may reserve a MAC identifier. Other examples are possible as well.

The channel assignment message will preferably contain identifying information for the channel, which the given mobile station 14 may use to acquire the channel. For example, if the channel assignment message is a 1×RTT channel assignment message (CAM), the 1×RTT CAM may contain one or more carrier frequencies, a PN offset, and/or a Walsh code. As another example, if the channel assignment message is an EV-DO traffic channel assignment (TCA) message, the EV-DO TCA may contain one or more carrier frequencies, a PN offset, and a MAC identifier. Other examples are possible as well.

The channel assignment message may also contain an identifier of its intended recipient, which may be the given mobile station 14. The identifier may be, for example, a mobile identification number (MIN), an international mobile subscriber identity (IMSI), a unicast access terminal identifier (UATI), or some other identifier for a mobile station 14. The given mobile station 14 may then use the identifier in a received channel assignment message to determine whether the given mobile station 14 is the intended recipient. In this respect, the given mobile station 14 may accept the channel assignment message, and the channel being assigned, if the identifier in the channel assignment message matches an identifier of the given mobile station 14.

In addition to assigning a channel for the communication to the given mobile station 14 in each identified wireless coverage area without first paging the given mobile station 14, the RAN 12 may also page the given mobile station 14 in all other wireless coverage areas of the RAN 12. In this respect, the RAN 12 may still be able to locate the given mobile station 14 even if the given mobile station 14 is not located within an identified wireless coverage.

If the given mobile station 14 is located in a given wireless coverage area that is included in the one or more identified wireless coverage areas, then the given mobile station 14 may accept assignment of the channel from the RAN 12 in the given wireless coverage area. In turn, the given mobile station 14 may send to the RAN 12, and the RAN 12 may receive, an indication that the given mobile station 14 has accepted the assignment of the channel in the given wireless coverage area. For example, in 1×RTT compliant communications, the given mobile station 14 may send a Preamble message and/or an ACK message to the RAN 12. As another example, in EV-DO compliant communications, the given mobile station 14 may send a Traffic Channel Complete (TCC) message. Other examples are possible as well.

During the channel assignment at step 58, the RAN 12 may also assign channels to the given mobile station 14 in identified wireless coverage areas where the given mobile station 14 is not located. For example, the given mobile station 14 may be located in a first sector, but the RAN 12 may assign channels to the given mobile station 14 in both the first sector and a second sector that is adjacent to the first sector, since the RAN 12 identified both the first and second sectors as being sectors in which the given mobile station 14 may be operating. In this respect, the given mobile station 14 may not be available to accept the assignment of channels in various identified wireless coverage areas of the RAN 12. As such, the RAN 12 may release an assigned channel in a given identified wireless coverage area after a predetermined time period (e.g., 100 ms) unless the given mobile station 14 has accepted assignment of the channel in that given wireless coverage area. Alternatively, the RAN 12 may release an assigned channel in a first identified wireless coverage area if the RAN 12 receives an indication that the given mobile station 14 has accepted assignment of a channel in a second identified wireless coverage area. In either case, by releasing the unused channels, the RAN 12 may later assign the channels to other mobile stations 14 that are located in these wireless coverage areas.

After the channel assignment at step 58, the RAN 12 may also determine that the given mobile station 14 has not accepted the assignment of a channel in any of the one or more identified wireless coverage areas within a predetermined time period (e.g., 100 ms). For example, the RAN 12 may determine that it has not received an indication that the given mobile station 14 accepted assignment of a channel in any of the identified wireless coverage areas within a predetermined time period. In response to this determination, the RAN 12 may then page the given mobile station 14, such as by sending a page message for receipt by the given mobile station 14. Preferably, the predetermined time period for making this determination will be substantially similar to the predetermined time period for releasing the channels, as described above.

Advantageously, the method described above may reduce the number of messages exchanged when setting up a communication the given mobile station 14 served by the RAN 12. More particularly, the present method may eliminate any paging messages exchanged between the given mobile station 14 and the RAN 12, and the present method may also eliminate certain signaling messages exchanged between entities of the RAN 12. In turn, this reduction of messages (and the delay between the messages) may shorten the time for setting up the communication with the given mobile station 14, which is desirable for certain customers and applications (e.g., VoIP, PTT, etc.). Further, the reduction of messages during communication setup may also reduce the paging load of the RAN 12.

Figure 5:
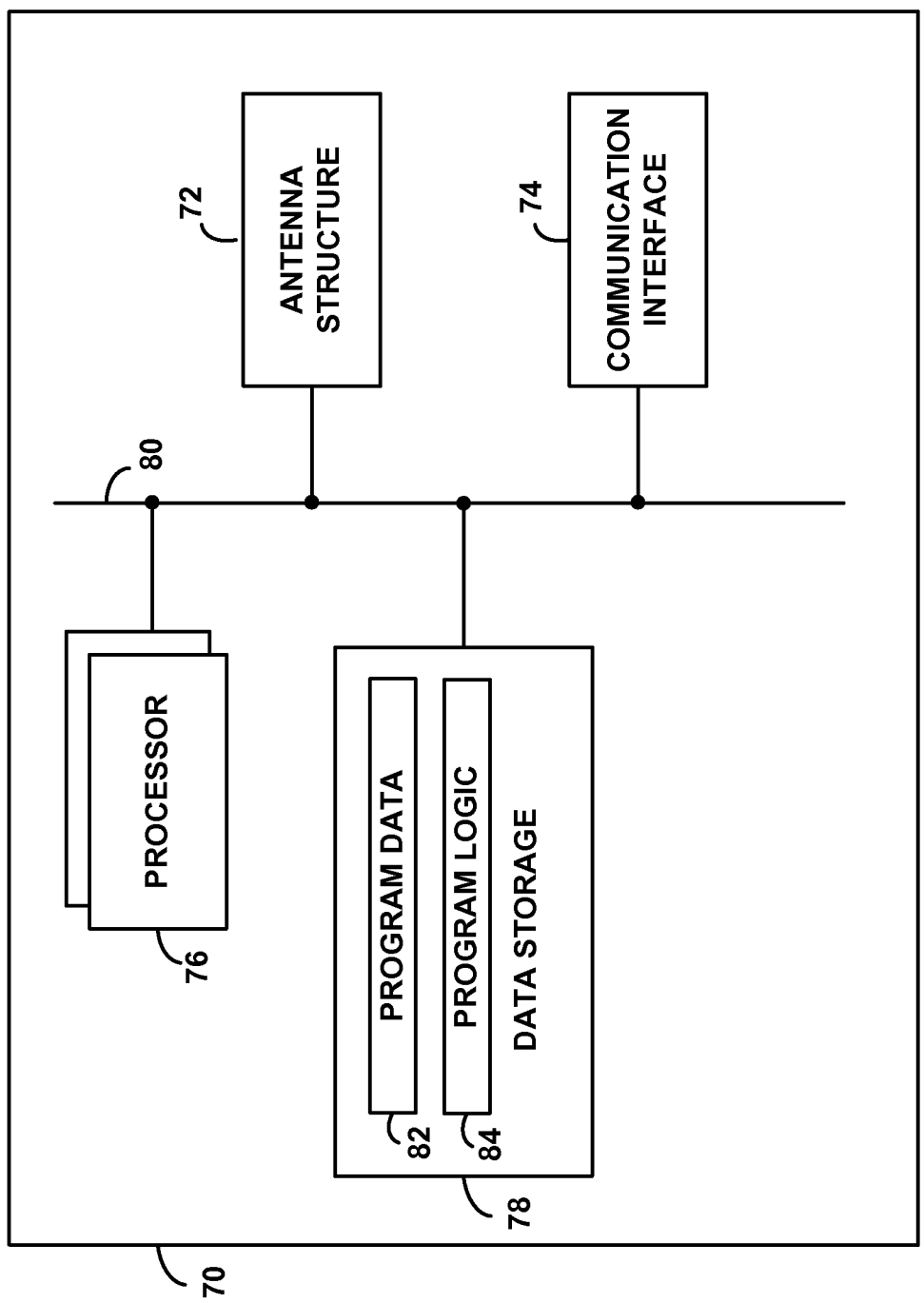
FIG. 5 is a simplified block diagram of an Access Node, showing functional components that can operate to carry out aspects of the exemplary embodiment.

The functionality of the present invention may be implemented in one or more entities of the RAN 12. For example, the Access Node described above, which includes the Node-Bs 42 and the RNC 44, may carry out functions of the present invention. Accordingly, FIG. 5 is a simplified block diagram of an Access Node, showing functional components that can operate to carry out aspects of the present invention. As shown in FIG. 5, the exemplary Access Node 70 includes, without limitation, an antenna structure 72, a communication interface 74, a processor 76, and data storage 78, all linked together via a system bus, network, or other connection mechanism 80. The exemplary Access Node 70 may also include other components, such as a PCF (not shown).

Referring to FIG. 5, the antenna structure 72 of the Access Node 70 may be substantially similar to the antenna structure 20 described with reference to FIG. 1. As such, the antenna structure 72 may provide one or more air interfaces 22 though which the mobile stations 14 may communicate with the Access Node 70. The antenna structure 72 may be arranged in various ways. For example, the antenna structure 72 may include one or more antennas. In one respect, the one or more antennas may include one or more omni-directional antennas and/or one or more directional (e.g., sectored) antennas. In another respect, the one or more antennas may include one or more antennas for receiving RF signals and one or more antennas for transmitting RF signals away from the antenna structure 72. The RF signals transmitted away from the antenna structure 72 may then provide the one or more air interfaces 22, each of which defines a corresponding wireless coverage area.

The communication interface 74 preferably functions to communicatively couple the Access Node 70 to other networks, such as the circuit-switched network 16 via the MGW 46 and the packet-switched network via the PSDN 48. As such, the communication interface 74 may take the form of an Ethernet network interface card, a chipset and antenna adapted to facilitate wireless communication according a desired protocol, and/or any other form that provides for wireless and/or wired communication with the other networks of the system 10. The Access Node 70 may also include multiple communication interfaces 74, such as one through which the Access Node 70 sends communication, and one through which the Access Node 70 receives communication.

The processor 76 may comprise one or more general purpose microprocessors and/or dedicated signal processors. (The term "processor" encompasses either a single processor or multiple processors that could work in combination.) Data storage 78, in turn, may comprise memory and/or other storage components, such as optical, magnetic, organic or other memory or disc storage, which can be volatile and/or non-volatile, internal and/or external, and integrated in whole or in part with the processor 76. Data storage 78 preferably contains or is arranged to contain (i) program data 82 and (ii) program logic 84. Although these components are described herein as separate data storage elements, the elements could just as well be physically integrated together or distributed in various other ways. In a preferred example, the program data 82 would be maintained in data storage 78 separate from the program logic 74, for easy updating and reference by the program logic 74.

Program data 82 may contain information about the wireless coverage areas of the Access Node 70. For example, program data 82 may contain one or more identifiers of the wireless coverage areas, such as the one or more carrier frequencies and/or the PN offset characterizing the wireless coverage area. As another example, program data 82 may contain defining information for each of the wireless coverage areas, such as boundary information in the form of coordinates. Program data 82 may contain other information about the wireless coverage areas as well.

Program data 82 may also contain information about the location of the mobile stations 14. For example, program data 82 may contain an identifier for each mobile station 14 (e.g., an MIN, IMSI, and/or UATI), and program data 82 may then contain prior and/or current location data corresponding to the identifiers of the mobile stations 14. In this respect, the Access Node 70 may use the location data to more accurately identify associated wireless coverage areas for the mobile stations 14.

Program logic 84 preferably comprises machine language instructions that may be executed or interpreted by processor 76 to carry out functions according to examples of the present invention, including the functions described with reference to FIG. 4. It should be understood, however, that the program logic 74 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 74 may be executable by the processor 76 to (i) receive an indication of a location of the given mobile station 14 via the antenna structure 72, (ii) use the location of the given mobile station 14 to identify one or more wireless coverage areas associated with the given mobile station 14 (e.g., by referencing program data 82), (iii) receive a request to set up a communication with the given mobile station 14 via the communication interface 74, and (iv) assign a channel for the communication to the given mobile station 14 in each identified wireless coverage area via the antenna structure 72, without first paging the given mobile station 14.

Further, after assigning channels to the given mobile station 14, the program logic 74 may be executable by the processor 76 to (i) receive an indication that the given mobile station 14 has accepted the assignment of a channel in a given wireless coverage area, (ii) release an assigned channel in a given identified wireless coverage area after a predetermined time period unless the given mobile station 14 has accepted assignment of the channel, (iii) release an assigned channel in a first identified wireless coverage area in response to receiving an indication that the given mobile station 14 has accepted assignment of a channel in a second identified wireless coverage area, and (iv) page the given mobile station 14 in response to a determination that the given mobile station 14 has not accepted the assignment of a channel in any of the one or more identified wireless coverage areas within a predetermined time period.

Exemplary embodiments of the present invention have been described above. Those skilled in the art will understand, however, that changes and modifications may be made to the embodiments described without departing from the true scope and spirit of the present invention, which is defined by the claims.

We claim:

1. A method comprising:
   in a radio access network having a stored indication of a location of a given mobile station, receiving a request to set up a communication with the given mobile station;
   in response to receiving the request, and without first sending a message to locate the given mobile station, (a) reserving a traffic-channel resource for exchanging bearer traffic with the given mobile station in each of two or more wireless coverage areas of the radio access network and (b) transmitting, in each of the two or more wireless coverage areas, a message identifying the traffic-channel resource reserved for exchanging bearer traffic with the given mobile station in the respective wireless coverage area;
   receiving an indication that the given mobile station has accepted the traffic-channel resource reserved for exchanging bearer traffic with the given mobile station in a given one of the two or more wireless coverage areas; and
   in response to receiving the indication, releasing the traffic-channel resource reserved for exchanging bearer traffic with the given mobile station in every other of the two or more wireless coverage areas.

2. The method of claim 1, wherein the indication of the location of the given mobile station comprises one or more of:
   a GPS location reading for the given mobile station; and
   information about signals the given mobile station has received from the radio access network.

3. The method of claim 1, wherein the radio access network has the stored indication of the location of the given mobile station as a result of one or more of:
   the given mobile station sending the indication of the location to the radio access network periodically according to a schedule; and
   the given mobile station sending the indication of the location to the radio access network in response to a change in location by the given mobile station.

4. The method of claim 1, wherein the two or more wireless coverage areas comprise two or more coverage areas identified based on the stored indication of the location of the given mobile station.

5. The method of claim 1, wherein at least one of the two or more wireless coverage areas encompasses the location of the given mobile station.

6. The method of claim 1, wherein each of the two or more wireless coverage areas comprises a cell sector.

7. The method of claim 1, wherein each message identifying a traffic-channel resource reserved for exchanging bearer traffic with the given mobile station in a respective wireless coverage area comprises a channel assignment message.

8. The method of claim 1, wherein each message identifying a traffic-channel resource reserved for exchanging bearer traffic with the given mobile station in a respective wireless coverage area contains an identifier of the given mobile station.

9. The method of claim 8, wherein the identifier of the given mobile station comprises one or more of:
   a mobile identification number;
   an international mobile subscriber identity; and
   a unicast access terminal identifier.

10. The method of claim 1, wherein each message identifying a traffic-channel resource reserved for exchanging bearer traffic with the given mobile station in a respective wireless coverage area contains one or more of a carrier frequency, a pseudorandom number offset, a Walsh code, and a MAC identifier.

11. The method of claim 1, wherein the indication that the given mobile station has accepted the traffic-channel resource reserved for exchanging bearer traffic with the given mobile station in the given one of the two or more wireless coverage areas comprises one or more of:
   a preamble message;
   an ACK message; and
   a Traffic Channel Complete message.

12. A radio access network comprising:
   one or more antenna structures for communicating with mobile stations located in a plurality of wireless coverage areas;
   a processor,
   data storage; and
   program instructions stored in the data storage and executable by the processor to carry out functions including:
      storing an indication of a location of a given mobile station;
      receiving a request to set up a communication with the given mobile station;
      in response to receiving the request, and without first sending a message to locate the given mobile station, (a) reserving a traffic-channel resource for exchanging bearer traffic with the given mobile station in each of two or more wireless coverage areas and (b) transmitting, in each of the two or more wireless coverage areas, a message identifying the traffic-channel resource reserved for exchanging bearer traffic with the given mobile station in the respective wireless coverage area;
      receiving an indication that the given mobile station has accepted the traffic-channel resource reserved for exchanging bearer traffic with the given mobile station in a given one of the two or more wireless coverage areas; and
      in response to receiving the indication, releasing the traffic-channel resource reserved for exchanging bearer traffic with the given mobile station in every other of the two or more wireless coverage areas.

13. The radio access network of claim 12, wherein the indication of the location of the given mobile station comprises one or more of:
   a GPS location reading for the given mobile station; and
   information about signals the given mobile station has received from the radio access network.

14. The radio access network of claim 12, wherein the two or more wireless coverage areas comprise two or more coverage areas identified based on the indication of the location of the given mobile station.

15. The radio access network of claim 12, wherein each message identifying a traffic-channel resource reserved for exchanging bearer traffic with the given mobile station in a respective wireless coverage area comprises a channel assignment message.

16. The radio access network of claim 12, wherein the indication that the given mobile station has accepted a traffic-channel resource reserved for exchanging bearer traffic with the given mobile station in a given one of the two or more wireless coverage areas comprises one or more of:
   a preamble message;
   an ACK message; and
   a Traffic Channel Complete message.

17. The radio access network of claim 12, further comprising channel elements, and wherein reserving a traffic-channel resource for exchanging bearer traffic with the given mobile station in each of two or more wireless coverage areas comprises reserving a channel element for exchanging bearer traffic with the given mobile station in each of two or more wireless coverage areas.

* * * * *